US012732596B2

(12) United States Patent
Rao et al.

(10) Patent No.: US 12,732,596 B2
(45) Date of Patent: Sep. 8, 2026

(54) RF AND OPTICAL MESSAGE ASSOCIATION

(71) Applicant: Ford Global Technologies, LLC, Dearborn, MI (US)

(72) Inventors: Jayanthi Rao, West Bloomfield, MI (US); Arpita Chand, Corvallis, OR (US); Niraj Altekar, Mumbai (IN); Mike Ryan, New Hudson, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 160 days.

(21) Appl. No.: 18/484,673

(22) Filed: Oct. 11, 2023

(65) Prior Publication Data

US 2025/0126232 A1 Apr. 17, 2025

(51) Int. Cl.

| | |
|---|---|
| ***H04N 7/22*** | (2006.01) |
| ***B60W 60/00*** | (2020.01) |
| ***G06V 10/80*** | (2022.01) |
| ***G06V 20/58*** | (2022.01) |
| ***H04B 10/11*** | (2013.01) |

(52) U.S. Cl.

CPC .............. *H04N 7/22* (2013.01); *B60W 60/00* (2020.02); *G06V 10/80* (2022.01); *G06V 20/584* (2022.01); *H04B 10/11* (2013.01); *B60W 2420/403* (2013.01); *B60W 2420/54* (2013.01); *B60W 2556/35* (2020.02); *B60W 2556/45* (2020.02)

(58) Field of Classification Search

CPC .. H04N 7/22; B60W 60/00; B60W 2420/403; B60W 2420/54; B60W 2556/35; B60W 2556/45; G06V 10/80; G06V 20/584; H04B 10/11

See application file for complete search history.

(56) References Cited

U.S. PATENT DOCUMENTS

| | | | |
|---|---|---|---|
| 11,388,565 B2 | 7/2022 | Hwang et al. | |
| 2021/0181745 A1* | 6/2021 | Liu ...................... | G05D 1/0274 |
| 2021/0331695 A1 | 10/2021 | Ramakrishnan et al. | |
| 2022/0161815 A1* | 5/2022 | Van Beek ............. | B60W 40/09 |
| 2025/0091608 A1* | 3/2025 | Monteuuis ....... | G08G 1/096716 |

* cited by examiner

*Primary Examiner* — Nathan J Flynn
*Assistant Examiner* — Christine A Kurien
(74) *Attorney, Agent, or Firm* — Joseph Zane; Brooks Kushman P.C.

(57) ABSTRACT

Data fusion of radio frequency (RF) and visual data is provided. Via a transceiver of a vehicle, a vehicle-to-everything (V2X) message is received from a remote road entity, the V2X message including one or more V2X data elements descriptive of the remote road entity. Using a camera of the vehicle, modulated light data is captured within a sensing area surrounding an ego road entity, the modulated light data being sent from the remote road entity. A modulated light transmission in the modulated light data is decoded to identify one or more light data elements in the modulated light data descriptive of the road entity. An association of the one or more V2X data elements is performed with the one or more light data elements to identify associated V2X camera objects where the V2X message and the modulated light data are fused into a combined representation of the remote road entity.

26 Claims, 6 Drawing Sheets

RF AND OPTICAL MESSAGE ASSOCIATION

TECHNICAL FIELD

Aspects of the disclosure generally relate to using optical signaling to associate camera objects with vehicle-to-vehicle (V2V) radio frequency (RF) messages.

BACKGROUND

Vehicle-to-everything (V2X) allows vehicles to exchange information with other vehicles, as well as with infrastructure, pedestrians, networks, and other devices. Vehicle-to-infrastructure (V2I) communication enables applications to facilitate and speed up communication or transactions between vehicles and infrastructure. In a vehicle telematics system, a telematics control unit (TCU) may be used for various remote-control services, such as over the air (OTA) software download, eCall, and turn-by-turn navigation.

SUMMARY

In one or more illustrative embodiments, an ego road entity for performing data fusion of RF and visual data, includes a transceiver; a camera; and one or more controllers of. The one or more controllers are configured to receive, via the transceiver, a V2X message from a remote road entity, the V2X message including one or more V2X data elements descriptive of the remote road entity, capture, using the camera, modulated light data within a sensing area surrounding the ego road entity, the modulated light data being sent from the remote road entity, decode a modulated light transmission in the modulated light data to identify one or more light data elements in the modulated light data descriptive of the remote road entity, perform an association of the one or more V2X data elements with the one or more light data elements to identify associated V2X camera objects where the V2X message and the modulated light data refer to the same remote road entity, wherein the V2X data elements and the modulated light data are fused into a combined representation of the remote road entity, and process the combined representation of the remote road entity based on the association.

In one or more illustrative examples, a method for data fusion of RF and visual data is performed. Via a transceiver, a V2X message is received from a road entity, the V2X message including one or more V2X data elements descriptive of the road entity. Using a camera, modulated light data is captured within a sensing area surrounding a vehicle, the modulated light data being sent from the road entity. A modulated light transmission in the modulated light data is decoded to identify one or more light data elements in the modulated light data descriptive of the road entity. An association of the one or more V2X data elements is performed with the one or more light data elements to identify associated V2X camera objects where the V2X message and the modulated light data refer to the same road entity, wherein the V2X data elements and the modulated light data are fused into a combined representation of the road entity. The combined representation of the road entity is processed based on the association.

In one or more illustrative examples, a non-transitory computer-readable medium includes instructions for performing data fusion of RF and visual data that, when executed by one or more controllers of an ego road entity, causes the ego road entity to perform operations including to receive, via a transceiver of the ego road entity, a V2X message from a remote road entity, the V2X message including one or more V2X data elements descriptive of the remote road entity; capture, using a camera of the ego road entity, modulated light data within a sensing area surrounding the ego road entity, the modulated light data being sent from the remote road entity; decode a modulated light transmission in the modulated light data to identify one or more light data elements in the modulated light data descriptive of the remote road entity; perform an association of the one or more V2X data elements with the one or more light data elements to identify associated V2X camera objects where the V2X message and the modulated light data refer to the same road entity, wherein the one or more V2X data elements and the modulated light data are fused into a combined representation of the remote road entity; and process the combined representation of the remote road entity based on the association.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Vehicles may receive situational awareness information from multiple sources. These sources may include RF messages via V2X communication, as well as sensor information captured using cameras, radio detection and ranging (RADAR), and light detection and ranging (LIDAR), as some examples.

The captured sensor information may show tracked vehicles or other objects. Also, the V2X communication messages may include information such as vehicle heading, location, and dimensions. Due to this overlap, the V2X information may be used to associate a vehicle captured in a camera image with the V2X message. Accuracy of this association may be dependent on factors such as lighting conditions, correctness of location info in the V2X message, object detection confidence, etc. In some examples, multiple camera frames or data from other sensors (such as RADAR)

may be required to compute higher derivatives (e.g., speed, rate of change in speed) of location of the target vehicle. These computations may be inaccurate due to errors in the location information in the V2X message, and partial visibility of the vehicle in the image, among other issues.

To address these issues, an approach may be implemented using modulated optical communications. These optical communications may be made between the vehicle lights as a transmitter, and a camera system of another vehicle as a receiver. The vehicle lights may include headlights and/or taillights of a vehicle, as some examples. This light-based communications channel may be used to exchange information to aid in the data fusion process. For instance, vehicle lights may be modulated with signal information such as an identifier (ID) used in the V2X messages, object type, location, speed, heading, etc. The camera systems of the neighboring vehicles may capture this optical communication and use the ID to associate the vehicles with the V2X messages received via the V2X interface. For example, the vehicle cameras may scan for light sources and may decode the modulated information from any detected light sources. The receiving vehicle may associate the ID and object type in the signaled data to the same fields in the V2X messages to perform the association. By fusing data using this approach, a more accurate association may be made between visual and RF data.

Figure 1:
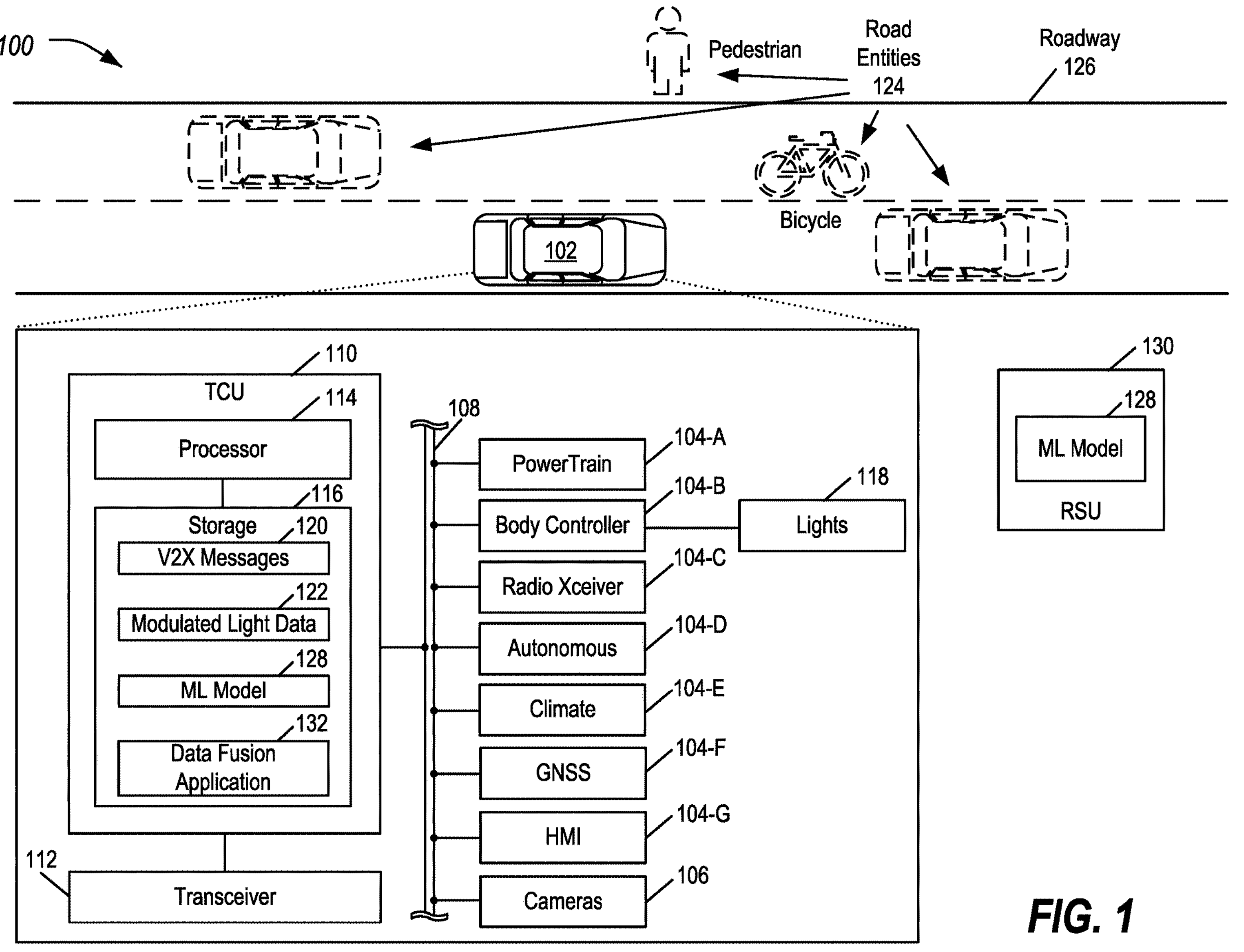
FIG. 1 illustrates an example system for performing data fusion using optical signaling to associate detected objects in captured images with received V2X messages.

FIG. 1 illustrates an example system 100 for using optical signaling to associate detected objects in captured images with received V2X messages. The system 100 may include a vehicle 102 having controllers 104 and cameras 106 that communicate over one or more vehicle buses 108. The vehicles 102 may also include a TCU 110 configured to provide communications services via a transceiver 112. The TCU 110 may include a processor 114 and storage 116. The vehicle 102 may also include exterior lights 118 configured to modulate signals over light-based communication. The TCU 110 may be used to send and receive V2X messages 120. The cameras 106 may be configured to capture such modulated light data 122. The V2X messages 120 and modulated light data 122 may relate to road entities 124 in the roadway 126, roadside units (RSUs) 130, or other objects in the environment surrounding the vehicle 102 (e.g., road signs, smart and connected infrastructure, etc.). A data fusion application 132 may be installed to the TCU 110 and may be configured to associate ID and object type information in the modulated light data 122 to corresponding information in the V2X messages 120 to construct an accurate association between visual and RF data. It should be noted that the system 100 is only an example, and systems 100 having more, fewer, and different components may be used.

The vehicle 102 may include various types of automobile, crossover utility vehicle (CUV), sport utility vehicle (SUV), truck, recreational vehicle, motorcycle, boat, plane or other mobile machine for transporting people or goods. Such vehicles 102 may be human-driven or autonomous. In many cases, the vehicle 102 may be powered by an internal combustion engine. As another possibility, the vehicle 102 may be a battery electric vehicle powered by one or more electric motors. As a further possibility, the vehicle 102 may be a hybrid electric vehicle powered by both an internal combustion engine and one or more electric motors, such as a series hybrid electric vehicle, a parallel hybrid electrical vehicle, or a parallel/series hybrid electric vehicle.

The vehicle 102 may be a vehicle driven by a driver with driver assistance features. In other examples, the vehicle may be a semi-autonomous vehicle (AV). These AV or driver assistance features may be supported via received V2X data and/or optical data. The level of automation may vary between variant levels of driver assistance technology to a fully automatic, driverless vehicle. As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as vehicle identification numbers (VINs). It should be noted that while automotive vehicles 102 are being used as examples of traffic participants, other types of traffic participants may additionally or alternately be used, such as bicycles, scooters, and pedestrians, which may be equipped with V2X technology.

The vehicle 102 may include a plurality of controllers 104 configured to perform and manage various vehicle 102 functions under the power of the vehicle battery and/or drivetrain. As depicted, the example vehicle controllers 104 are represented as discrete controllers 104 (i.e., controllers 104A through 104G). However, the vehicle controllers 104 may share physical hardware, firmware, and/or software, such that the functionality from multiple controllers 104 may be integrated into a single controller 104, and that the functionality of various such controllers 104 may be distributed across a plurality of controllers 104.

As some non-limiting vehicle controller 104 examples: a powertrain controller 104A may be configured to provide control of engine operating components (e.g., idle control components, fuel delivery components, emissions control components, etc.) and for monitoring status of such engine operating components (e.g., status of engine codes); a body controller 104B may be configured to manage various power control functions such as the exterior lights 118, interior lighting, keyless entry, remote start, and point of access status verification (e.g., closure status of the hood, doors and/or trunk of the vehicle 102); a radio transceiver controller 104C may be configured to communicate with key fobs, mobile devices, or other local vehicle 102 devices; an autonomous controller 104D may be configured to provide commands to control the powertrain, steering, or other aspects of the vehicle 102; a climate control management controller 104E may be configured to provide control of heating and cooling system components (e.g., compressor clutch, blower fan, temperature, etc.); a global positioning system (GPS) controller 104F may be configured to provide vehicle location information; and a human-machine interface (HMI) controller 104G may be configured to receive user input via various buttons or other controls, as well as provide vehicle status information to a driver, such as fuel level information, engine operating temperature information, and current location of the vehicle 102.

The controllers 104 of the vehicle 102 may make use of the various cameras 106 in order to receive information with respect to the surroundings of the vehicle 102. In an example, these cameras 106 may include one or more of visible light cameras 106 (e.g., advanced driver assistance system (ADAS) cameras 106), infrared cameras 106, and/or multi-spectrum cameras 106. In some examples, the cameras 106 may include capture devices that operate using other approaches such as radar systems and/or lidar systems. In some examples, the cameras 106 may include rolling shutter complementary metal oxide semiconductor (CMOS) cameras 106 configured to receive light-based transmissions.

The vehicle bus 108 may include various methods of communication available between the vehicle controllers 104, as well as between the TCU 110 and the vehicle controllers 104. As some non-limiting examples, the vehicle bus 108 may include one or more of a controller area network (CAN), an Ethernet network, and a media-oriented system transfer (MOST) network.

The TCU 110 may include network hardware configured to facilitate communication between the vehicle controllers 104 and with other devices of the system 100. For example, the TCU 110 may include or otherwise access the transceiver 112 configured to facilitate communication with other vehicles 102 or with infrastructure. The TCU 110 may be configured to communicate over a broadcast peer-to-peer protocol (such as PC5), to facilitate cellular V2X (C-V2X) communications with devices such as other vehicles 102. The TCU 110 may also be configured to communicate over cellular networks to communicate over the Internet with other devices. It should be noted that these protocols are merely examples, and different peer-to-peer and/or cellular technologies may be used.

The TCU 110 may include various types of computing apparatus in support of performance of the functions of the TCU 110 described herein. In an example, the TCU 110 may include one or more processors 114 configured to execute computer instructions, and a storage 116 medium on which the computer-executable instructions and/or data may be maintained. A computer-readable storage medium (also referred to as a processor-readable medium or storage 116) includes any non-transitory (e.g., tangible) medium that participates in providing data (e.g., instructions) that may be read by a computer (e.g., by the processor(s)). In general, the processor 114 receives instructions and/or data, e.g., from the storage 116, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, JAVA, C, C++, C#, FORTRAN, PASCAL, VISUAL BASIC, PYTHON, JAVASCRIPT, PERL, etc.

The TCU 110 may be configured to facilitate the collection of V2X messages 120 and/or other vehicle information from the vehicle controllers 104 connected to the one or more vehicle buses 108. The TCU 110 may also be configured to facilitate the collection of modulated light data 122 captured by the cameras 106 of the vehicle 102. Examples of modulated light data 122 may include information captured in visible light transmissions, infrared light transmissions, ultraviolet light transmissions, multi-frequency modulated light transmission, etc.

The V2X messages 120 may include collected information retrieved from the controllers 104 over the vehicle buses 108. In many examples, the collected information data may include information useful for autonomous vehicle operations or driver-assistance vehicle operations. The connected vehicle data information retrieved by the TCU 110 may include, as some non-limiting examples, an ID of the sender, as well as data about the sender such as latitude, longitude, time, heading angle, speed, lateral changes in speed, longitudinal changes in speed, yaw rate, throttle position, brake status, steering angle, headlight status, wiper status, external temperature, turn signal status, vehicle length, vehicle width, vehicle mass, and bumper height. The connected vehicle data information may also include, weather data (such as ambient temperature, ambient air pressure, etc.), traction control status, wiper status, or other vehicle status information (such as the status of exterior vehicle lights, type of vehicle, antilock brake system (ABS) system status, etc.).

The V2X messages 120 may also include information with respect to detected road entities 124. For instance, the V2X message 120 may indicate information such as location, size, and/or contour of detected road entities 124 along a roadway 126. The V2X message 120 may also indicate a type of the road entity 124 (e.g., pedestrian, car, truck, debris, etc.).

In some examples, a machine learning model 128 may be executed to classify the road entity 124 into a plurality of object classifications, and the V2X message 120 may indicate the most likely type that the road entity 124 is determined to be (or in other examples, probabilities that the road entity 124 is of various types of road entity 124). This machine learning model 128 may be executed various devices, such as one or more controllers 104 of the vehicle 102, the TCU 110, a RSU 130, etc. It should be noted that, as a matter of perspective, a vehicle 102 may be an ego road entity 124 to other vehicles 102. Therefore aspects that are discussed in terms of a vehicle 102 may be performed by a road entity 124 from its perspective, and vice versa. Moreover, operations that are discussed as being performed by a vehicle 102 as an ego road entity 124 may also be performed by other types of road entity 124, such as by an RSU 130. The road entity 124 may, in turn, be equipped with V2X and/or light modulation capabilities. Messages from either the V2X or light modulation could include details about the road entity 124 that could in turn be used to enhance the machine learning model 128 classification capabilities (e.g., for classifying the road entity 124 into one of a plurality of object classifications and/or likelihoods of each classification.)

In some examples the road entities 124 may additionally involve communication via one or more RSUs 130. The RSU 130 may be a device with processing capabilities and networking capabilities and may be designed to be placed in proximity of a roadway 126 for use in communicating with the vehicles 102. For instance, the RSU 130 may include hardware configured to communicate over the broadcast peer-to-peer protocol (such as PC5), to facilitate C-V2X communications with the vehicles 102. In another example, the machine learning model 128 may be hosted by the RSU 130 to allow the road entities 124 to be classified without using the compute power of the vehicles 102. The RSU 130 may, accordingly, be able to communicate with multiple vehicles 102 along a specific roadway 126 or in a specific area. The RSU 130 may also have wired or wireless backhaul capability to allow for communication with other elements of a traffic control system, via e.g., Ethernet, or cellular connection to the cellular network infrastructure, for example over Uu interface.

While a single vehicle bus 108 is illustrated, it should be noted that in many examples, multiple vehicle buses 108 are included, with a subset of the controllers 104 connected to each vehicle bus 108. Accordingly, to access a given controller 104, the TCU 110 may be configured to maintain a mapping of which vehicle buses 108 are connected to which controllers 104, and to access the corresponding vehicle bus 108 for a controller 104 when communication with that particular controller 104 is desired.

The TCU 110 may be further configured to periodically transmit V2X messages 120 for reception by other vehicles 102. The position, dimension and heading of a vehicle 102 may be broadcast by the vehicle 102 in the in the V2X messages 120. In an example, the frequency of sending the V2X messages 120 may be on the order of every ten milliseconds. A V2X radio may be a relatively short-range communications unit (e.g., with a range on the order of one kilometer). In an example, the V2X radio may operate on Cellular V2X (e.g., C-V2X 3GPP). In another example, the V2X radio may operate on Institute of Electrical and Electronics Engineer (IEEE) 802.11p Dedicated Short Range Communication (DSRC). In one example, the V2X messages 120 may take the form of BSM messages as described in the Society of Automotive Engineers (SAE) standard document J2735. In another example, the V2X message 120 may take the form of sensor data sharing messages (SDSM) messages as described in the SAE standard document J3224.

The TCU 110 may be further configured to receive V2X messages 120 from other vehicles 102 or other road entities 124. In an example, the vehicle 102 may be referred to as a host vehicle (HV) and remote vehicles (RV) surrounding the HV may be in communication with the vehicle 102 as road entities 124. In another example, the HV may be in communication with other road entities 124, such as bicyclists, pedestrians, etc.

The body controller 104B may be configured modulate information using the exterior lights 118. Similar to the reception of V2X messages 120, this information may be collected as modulated light data 122 send by other road entities 124. Visible light communication (VLC), such as LiFi, may be used to send information. LiFi is a wireless communication technology which utilizes light to transmit data and position between devices. In an example, body controller 104B may utilize LiFi or other types of VLC for sending information using the exterior lights 118 to be sensed by camera cameras 106 of other vehicles 102. In some examples, the modulated light data 122 may include the same data element as included in the V2X messages 120. In other examples, the modulated light data 122 may include more, fewer, or different data elements that included in the V2X messages 120. Yet at least some overlap in data elements (e.g., location, ID, etc.) may be provided between the V2X messages 120 and the modulated light data 122 to allow for the information to be associated by a recipient.

The management of sending, receiving, and filtering of V2X messages 120 may be handled by a data fusion application 132 executed by the TCU 110. The data fusion application 132 may also be configured to receive the modulated light data 122 from the cameras 106 and fuse the modulated light data 122 with the V2X messages 120 to construct an overall view of the roadway 126. This fused representation may include, for example, data elements from the V2X messages 120 and or modulated light data 122, as well as image data showing the specific road entities 124 to which the data relates. These aspects are discussed in detail with respect to FIGS. 2-5.

Figure 2:
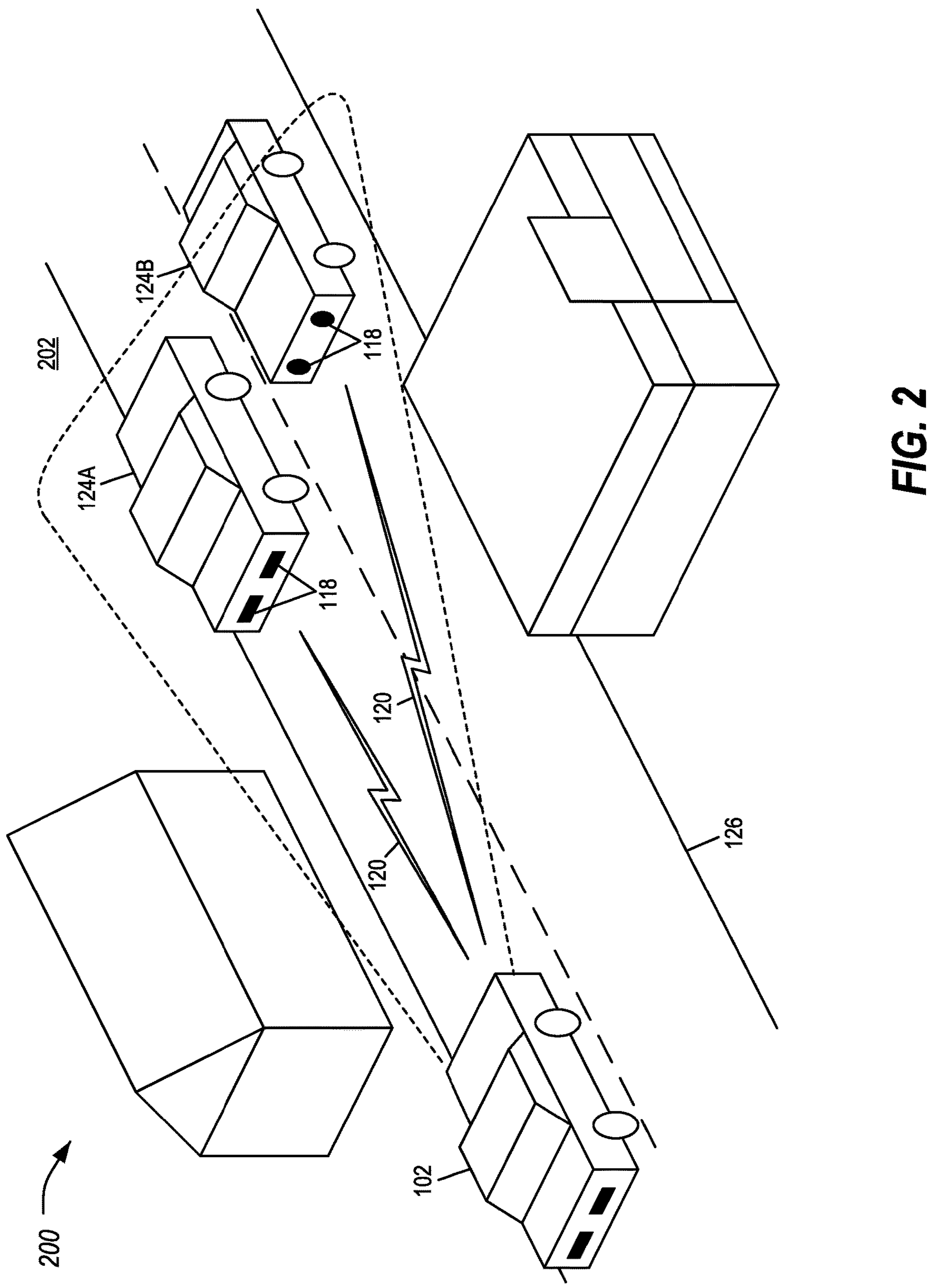
FIG. 2 illustrates an example of the vehicle receiving V2X messages and capturing sensor data.

FIG. 2 illustrates an example 200 of the vehicle 102 receiving V2X messages 120 and capturing modulated light data 122. The sensing area 202 may be defined by the sensing capabilities of the cameras 106 installed to the vehicle 102. As shown the modulated light data 122 is captured within a sensing area 202 of a forward facing camera 106 of the vehicle 102. It should be noted that this is only an example, and the vehicle 102 may have additional sensing areas 202 around other portions of the vehicle 102.

Also shown, the vehicle 102 is receiving V2X messages 120 from a first vehicle road entity 124A and from a second vehicle road entity 124B. These V2X message 120 may be sent by the first vehicle road entity 124A and the second vehicle road entity 124B, respectively. Additionally, the vehicle 102 is receiving modulated light data 122 from the first vehicle road entity 124A and the second vehicle road entity 124B. This information may be modulated into the operation of the exterior lights 118 of the first vehicle road entity 124A and the second vehicle road entity 124B.

Vehicles 102 that are equipped with C-V2X functionality may broadcast V2X messages 120 periodically. The frequency of the transmission of the V2X messages 120 may depends on factors such as density of vehicles 102 and may range from 10 Hz to about 2 Hz. V2X messages 120 may be received even when vehicles 102 or road entities 124 are non-line-of-sight (NLOS). Hence V2X messages 120 enables information about objects occluded to sensing areas 202 of the cameras 106 (or invisible due to low light conditions) to be available.

The V2X messages 120 may contain an ID that changes periodically to ensure that the road entity 124 is not tracked by other vehicles 102 or by other C-V2X capable devices. The V2X messages 120 may include additional information about the sender, such as universal time (UTC), latitude, longitude, heading, absolute speed, length, width, path history, and speed.

The modulated light data 122 may include information modulated over one or more frequencies of light. As compared to the V2X messages 120, the modulated light data 122 is, by definition, line-of-sight (LOS). This modulation may be imperceptible to the human eye but may be deciphered by the cameras 106. The cameras 106 may also be configured, in combination with the controllers 104, to monitor the environment, detect road entities 124, estimate speed, heading and/or other information regarding the detected road entities 124, and provide timely alerts about potential object interactions. The modulated light data 122 may also include the same ID that changes periodically. This may allow for a recipient to confirm that the modulated light data 122 relates to the V2X messages 120. The modulated light data 122 may include additional information about the sender, such as UTC, latitude, longitude, heading, absolute speed, length, width, path history, and speed.

Figure 3:
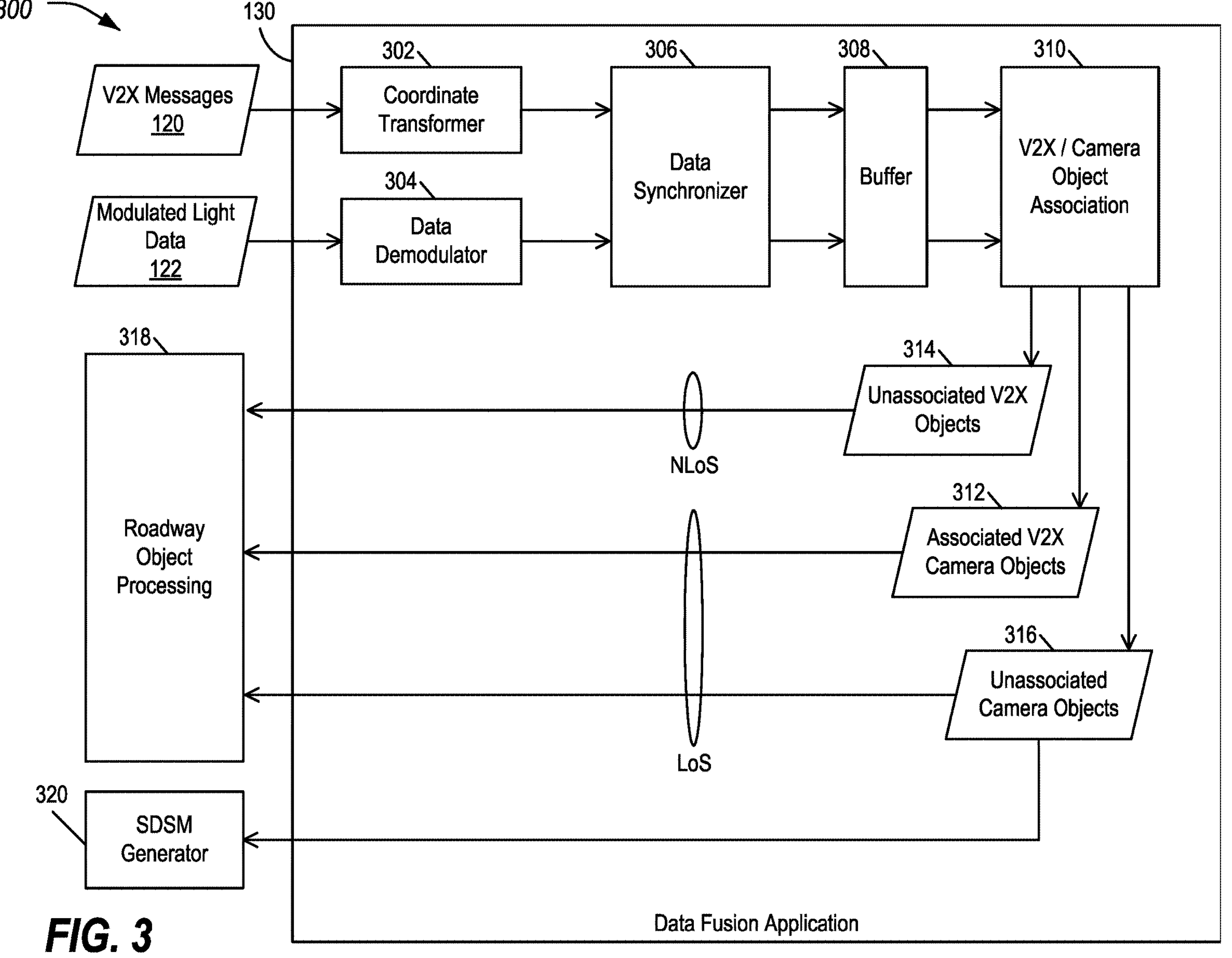
FIG. 3 illustrates an example of details of the processing of these V2X messages and sensor data by the data fusion application.

FIG. 3 illustrates an example 300 of details of the processing of these V2X messages 120 and modulated light data 122 by the data fusion application 132. As shown, the data fusion application 132 receives the V2X message 120 from the transceiver 112 and also receives the modulated light data 122 from the cameras 106. The data fusion application 132 may include a coordinate transformer 302, a data demodulator 304, a data synchronizer 306, a buffer 308, and a V2X/camera object associator 310.

The coordinate transformer 302 may receive the V2X messages 120. Based on the V2X messages 120, the coordinate transformer 302 may map the V2X messages 120 and the modulated light data 122 to a common coordinate system. This may include, for instance, placing the V2X messages 120 as an overlay on the captured modulated light data 122 based on the location information included in the V2X messages 120.

The data demodulator 304 may be configured to decode any modulated information included in the modulated light data 122. As noted above, the modulated light data 122 over time may include modulated VLC sent using the exterior lights 118 of the road entities 124. This information may be recognized using LiFi and or other VLC techniques to retrieve the modulated data stream. The modulated data may be decoded to augment the modulated light data 122 (and/or the identified road entities 124 in the modulated light data 122) with decoded information such as ID, object type, heading, speed, location, and/or whatever information is decoded from the modulated stream of modulated light data 122. Significantly, the V2X messages 120 and the modulated light data 122 may utilize the same IDs, to increase the accuracy of the data fusion.

Similar to how the coordinate transformer 302 aligns the V2X messages 120 and the modulated light data 122, the data synchronizer 306 may be configured to align the V2X messages 120 and the modulated light data 122 temporally. This may be performed by ordering the V2X messages 120 based on included timestamps and/or reception time in combination with the capture times of the modulated light data 122. The results of the synchronization may be provided to the buffer 308 for processing by the V2X/camera object associator 310.

The V2X/camera object associator 310 may be configured to associate the V2X messages 120 in the buffer 308 with the modulated light data 122 in the buffer 308. This may be performed, for example, by matching the locations of the V2X messages 120 and the modulated light data 122 determined by the coordinate transformer 302 together, such as by mapping together the location information from the V2X messages 120 and locations of the road entities 124 gleaned from the modulated light data 122. This mapping may include, for example, associating together the V2X messages 120 and modulated light data 122 based on the common IDs used for both streams of data. Or, in other examples, the associating may also include associating based on other fields of information, such as location, speed, heading, object type, etc.

In some examples, the V2X/camera object associator 310 may further be configured to utilize the machine learning model 128 to perform object detection in the modulated light data 122, or in other examples receive the object detection information may be performed by the machine learning model 128 from an upstream object preprocessor. In one example, the machine learning model 128 may be executed by a device outside the vehicle 102 through communication with the TCU 110. In an example, the TCU 110 may send data to the RSU 130 or to a mobile edge computing (MEC) device or to a server in communication with the vehicle 102 for processing.

The object detection may be done, for example, to identify locations of road entities 124 in the images captured by the cameras 106. In some examples, this may allow the data demodulator 304 to focus the demodulation on the regions in the modulated light data 122 that contain vehicle road entities 124. Additionally, this may allow for the V2X messages 120 to be associated with the specific objects in the images captured by the camera 106. In some examples, the combined representation may be provided to the machine learning model 128 to aid in an association of an image captured by the cameras 106 with the remote road entity 124.

The results of this associating may result in one of three possibilities: associated V2X camera objects 312, unassociated V2X objects 314, and unassociated camera objects 316. The associated V2X camera objects 312 refers to objects where V2X messages 120 and modulated light data 122 were fused into a combined representation. This combined representation may include, for example, data elements from the V2X messages 120 and or modulated light data 122, as well as image data showing the specific road entities 124 to which the data relates. The unassociated V2X objects 314 refers to objects where V2X messages 120 were received without associated modulated light data 122. The unassociated camera objects 316 refers to objects where road entities 124 in the modulated light data 122 were identified without associated V2X messages 120. In some examples, it may be inferred that the unassociated V2X objects 314 are NLOS, and it may be inferred that the associated V2X camera objects 312 and unassociated camera objects 316 are LoS.

The associated V2X camera objects 312, unassociated V2X objects 314, and unassociated camera objects 316 may be provided for various downstream tasks. In an example, the associated V2X camera objects 312, unassociated V2X objects 314, and unassociated camera objects 316 may be provided to roadway object processing 318 features, such as driver alerts, autonomous or semiautonomous driving, etc.

In another aspect, the unassociated camera objects 316 may be provided to a SDSM generator 320. The SDSM generator 320 may be configured to generate V2X messages 120 based on the observation of the respective unassociated camera object 316 by the vehicle 102. By sending the V2X message 120, the vehicle 102 may be able to inform other road entities 124 of aspects of the detected unassociated camera object 316.

In some examples, this may be done solely for unassociated camera objects 316, to alert the road entities 124 of detections that were not received to the vehicle 102 in the V2X messages 120, as these objects are the most likely to be unknown to the other road entities 124.

In other examples, the SDSM generator 320 may generate V2X messages 120 for all of the associated V2X camera objects 312, unassociated V2X objects 314, and unassociated camera objects 316. In yet another example, the SDSM generator 320 may generate V2X messages 120 for all of the associated V2X camera objects 312, unassociated V2X objects 314, and unassociated camera objects 316 if V2X RF congestion is below a threshold, but only for the unassociated camera objects 316 if V2X RF congestion exceeds the threshold.

Figure 4:
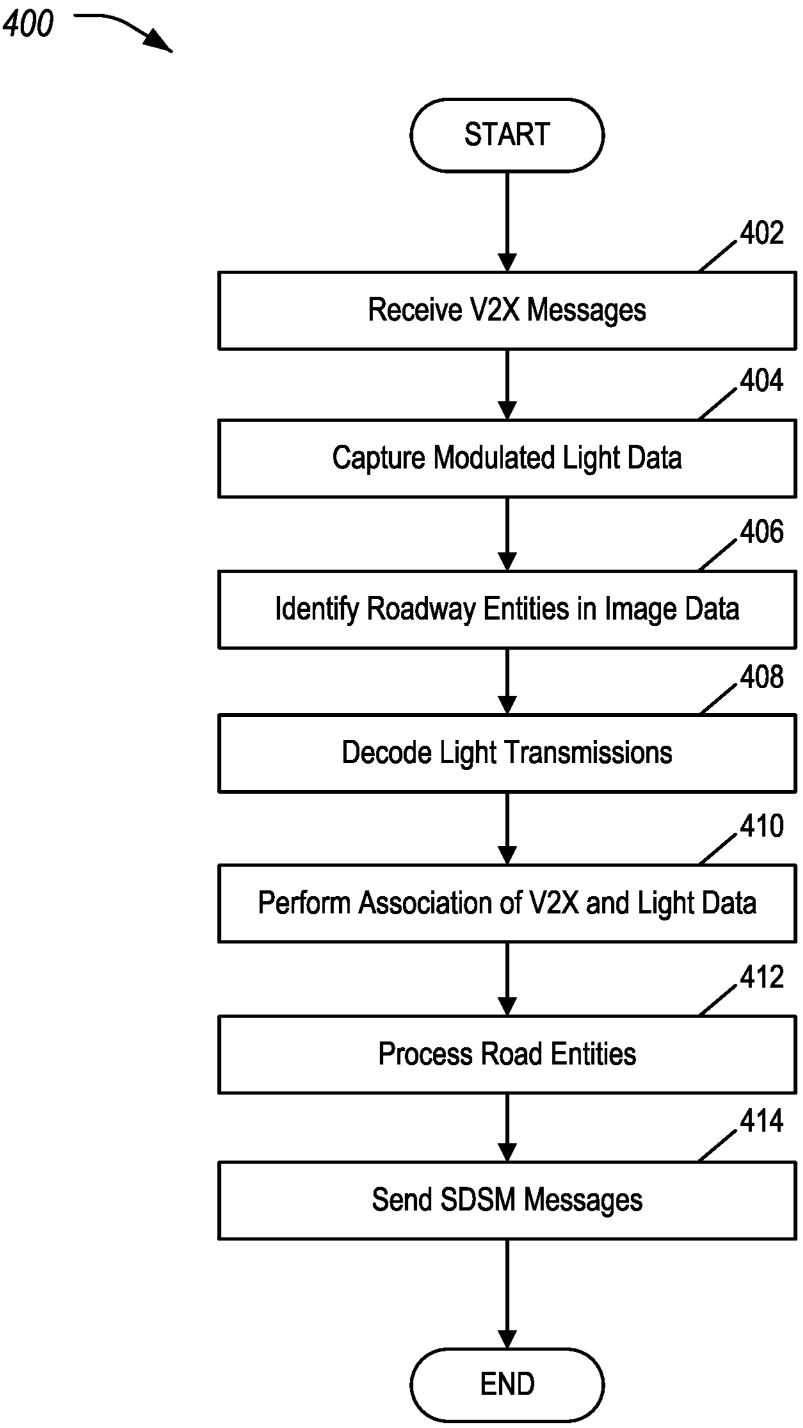
FIG. 4 illustrates an example process for performing data fusion using optical signaling to associate detected objects in captured images with received V2X messages.

FIG. 4 illustrates an example process 400 for performing data fusion using optical signaling to associate detected objects in captured images with received V2X messages 120. In an example, the process 400 may be performed by the data fusion application 132 executed by the TCU 110 of the vehicle 102, in the context of the system 100. It should be noted that this is only one possibility, and other types of ego road entity 124 such as an RSU 130, a MEC, a remote server, etc. may perform one or more aspects of the process 400.

At operation 402, the TCU 110 receives V2X messages 120. In an example, the TCU 110 may utilize the transceiver 112 to receive V2X messages 120 from other vehicles 102 or other road entities 124 configured to periodically send V2X messages 120. The frequency of the transmission of the V2X messages 120 may depends on factors such as density of vehicles 102 and may range from 10 Hz to about 2 Hz. The V2X messages 120 may be received to the TCU 110 even when the sending vehicles 102 or road entities 124 are NLOS.

At operation 404, the TCU 110 receives modulated light data 122. In an example, the TCU 110 may receive modulated light data 122 captured by the cameras 106 of the vehicle 102. For instance, the cameras 106 may include rolling shutter CMOS cameras 106 configured to receive light-based transmissions. These light-based transmissions may be sent as LiFi or other forms of VLC from other vehicles 102 using their exterior lights 118 and/or from other exterior lights 118 of various road entities 124.

At operation 406, the TCU 110 optionally identifies road entities 124 in the modulated light data 122. In an example, the V2X/camera object associator 310 may perform object detection in the modulated light data 122. In other examples, the V2X/camera object associator 310 may receive the object detection information from another device, such as the RSU 130. The object detection may be done, for example, to identify locations of road entities 124 in the modulated light data 122.

At operation 408, the TCU 110 decodes light transmissions received in the modulated light data 122. In an example, the data demodulator 304 may decode modulated information included in the modulated light data 122 as received to the camera 106. In some examples, if operation 406 is performed, the data demodulator 304 may focus on the demodulation on the regions in the modulated light data 122 that contain vehicle road entities 124.

At operation 410, the TCU 110 performs object association between the V2X messages 120 and the modulated light data 122. In an example, the V2X/camera object associator 310 may associate the V2X messages 120 by matching the information from the V2X messages 120 with the information decided from the light transmissions of the modulated light data 122. This may include, for example, associating together the V2X messages 120 and modulated light data 122 based on the common IDs used for both streams of data. Or, in other examples, the associating may also include associating based on other fields of information, such as location, speed, heading, object type, etc. The results of this associating may result in one of three possibilities: associated V2X camera objects 312, unassociated V2X objects 314, and unassociated camera objects 316.

At operation 412, the TCU 110 processes the objects based on the association. For instance, the associated V2X camera objects 312, unassociated V2X objects 314, and unassociated camera objects 316 may be provided to roadway object processing 318 features, such as driver alerts, autonomous or semiautonomous driving, etc. Significantly, by fusing data using information modulated in the modulated light data 122, a more accurate and less processor-intensive association may be made between visual and RF data as compared to pure image-based recognition techniques.

At operation 414, the TCU 110 optionally sends V2X messages 120 using the SDSM generator 320. The SDSM generator 320 may be configured to generate V2X messages 120 based on the observation of the respective unassociated camera object 316 by the vehicle 102. These generated V2X messages 120 may be broadcast by the transceiver 112.

In other examples, the SDSM generator 320 may generate V2X messages 120 for all of the associated V2X camera objects 312, unassociated V2X objects 314, and unassociated camera objects 316 (or potentially for all of the associated V2X camera objects 312, unassociated V2X objects 314, and unassociated camera objects 316 if V2X RF congestion is below a threshold, and only for the unassociated camera objects 316 if V2X RF congestion exceeds the threshold).

After operation 414, the process 400 ends. It should be noted that, in many examples, operations of the process 400 may be performed continuously in a loopwise manner. It should also be noted that one or more of the operations of the process 400 may be executed concurrently, and/or out of order from as shown in the process 400.

Figure 5:
FIG. 5 illustrates an example process for training the machine learning model in view of data collected from the vehicles.
Figure 5:
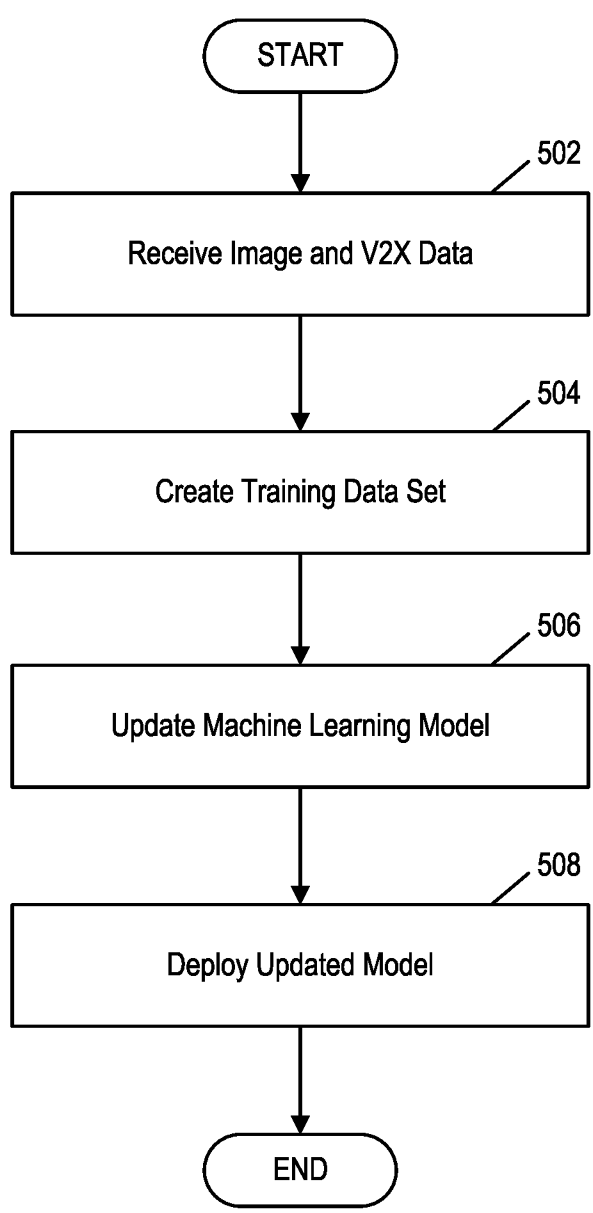

FIG. 5 illustrates an example process 500 for training the machine learning model 128 in view of data collected from the vehicles 102. In an example, the process 500 may be performed by a training device, which may include one or more of the computing devices discussed in detail herein, such as the TCU 110, the RSU 130, a MEC, a remote server, etc.

At operation 502, the training device receives V2X messages 120 and modulated light data 122 captured by the vehicles 102. This data may be captured as discussed in detail above as vehicles 102 traverse the roadways 126. In another example, the data may be captured as one or more vehicles 102 traverse a test roadway 126 having a set of test road entities 124 placed at known measured locations.

At operation 504, the training device constructs training data. For example, one or more frames of the modulated light data 122 may be used as input images for object detection. Moreover, the locations included in the V2X messages 120 and/or in the modulated light data 122 may be used utilized as center points or bounding boxes as ground truth for the locations of identified road entities 124 in the image data. These locations may be mapped into the image data using techniques consistent with the operation of the coordinate transformer 302 discussed above.

At operation 506, the training device performs machine learning using the received data. This training may be performed, using the locations of the V2X messages 120 and/or modulated light data 122 as ground truth, to allow the machine learning model 128 to learn to identify the locations of road entities 124 in image data. In an example, the training may include retraining the machine learning model 128 including at least a portion of the data received at operation 502. In another example, the training may include fine-tuning of the machine learning model 128, e.g., for improving recognition of a pretrained model in particular environmental factors such as weather, season, location, etc., without a complete retraining.

At operation 508, the training device provides the updates machine learning model 128 for use. In an example, this may include deploying the updated machine learning model 128 to the TCU 110, RSU 130, etc. for use. For example, the machine learning model 128 may be deployed for use in performing data fusion such as discussed with respect to the process 400. In another example the machine learning models 128 may be deployed for tasks without data fusion, such as recognition of road entities 124 without additionally using modulated light data 122. After operation 508, the process 500 ends.

Thus, the data fusion application 132 may be utilized to cooperatively combine sensing from multiple data sources, based on light modulated information, without information duplication. Moreover, while road entities 124 detected in the modulated light data 122 may be shared in V2X messages 120, the data fusion application 132 may prevent an excessive increase in wireless channel congestion, enabling multiple vehicles 102 to cooperatively share data in an efficient manner.

This approach leads to more accurate association as the receiver is receiving ground truth from the camera 106 rather than inferring/computing information. This approach may be especially useful in urban areas, where the global navigation satellite system (GNSS) accuracy of location information populated in the V2X messages 120 may not be precise enough to help match vehicles road entities 124 seen through the camera 106 during the association process.

In addition, RF signals may be received from the front, rear, and adjacent vehicles road entities 124. The optical channel allows some of these to be ignored, reducing the processing burden. For example, if the vehicle 102 receives an RF C-V2X and an optical object from the taillights of a vehicle road entity 124, the messages probably can be ignored as the vehicle 102 is behind the vehicle road entity 124. Also, the approach improves the accuracy of SDSM generation, by improving the confidence of association between detected camera objects and V2X messages 120.

Figure 6:
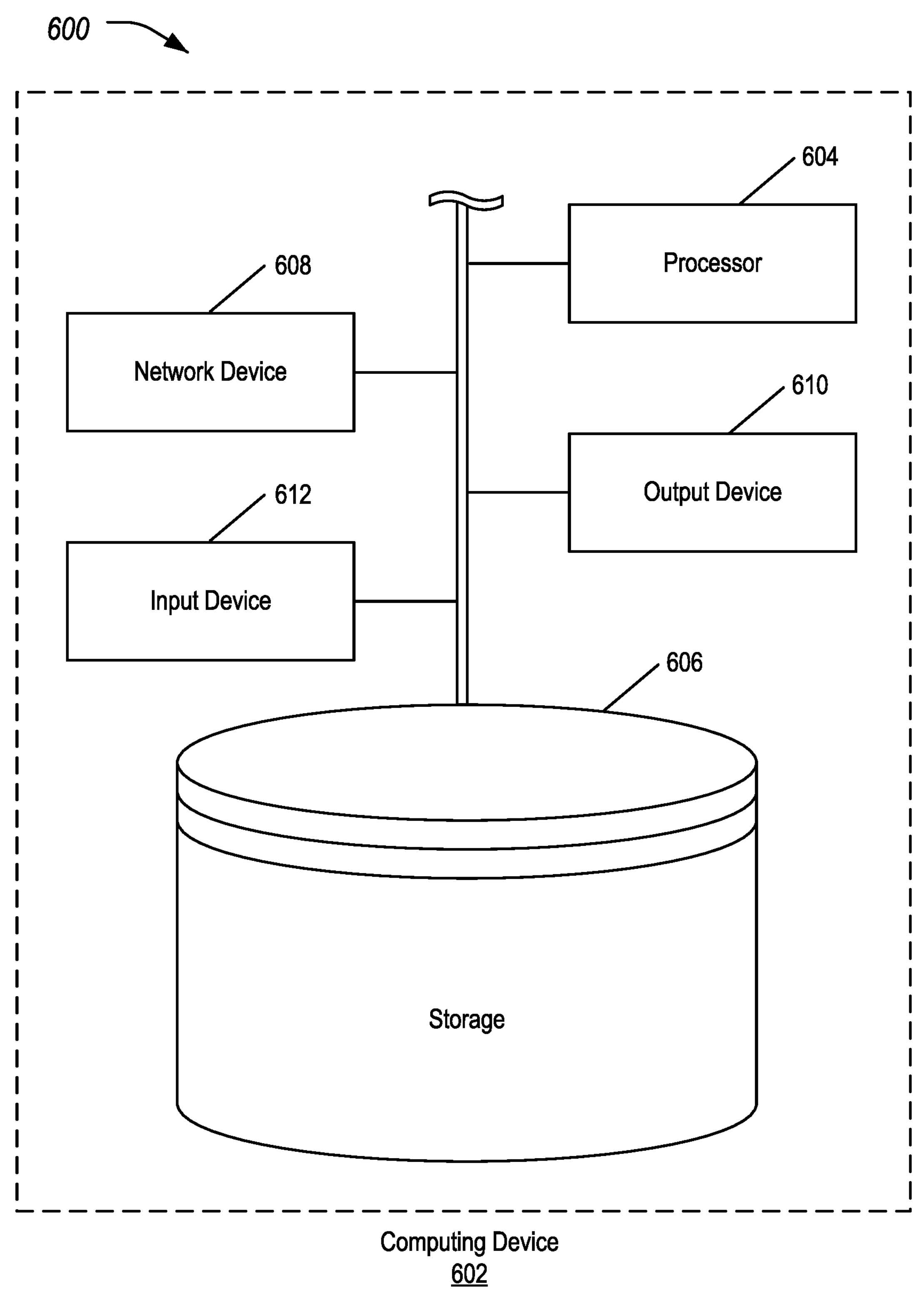
FIG. 6 illustrates an example of a computing device for use in performing cooperative sensor sharing between traffic participants.

FIG. 6 illustrates an example 600 of a computing device 602 for use in performing cooperative camera 106 sharing between road entities 124. Referring to FIG. 5, and with reference to FIGS. 1-5, the vehicles 102, controllers 104, TCU 110, transceivers 112, processors 114, road entities 124, and RSUs 130 may be examples of such computing devices 602. As shown, the computing device 602 includes a processor 604 that is operatively connected to a storage 606, a network device 608, an output device 610, and an input device 612. It should be noted that this is merely an example, and computing devices 602 with more, fewer, or different components may be used.

The processor 604 may include one or more integrated circuits that implement the functionality of a central processing unit (CPU) and/or graphics processing unit (GPU). In some examples, the processors 604 are a system on a chip (SoC) that integrates the functionality of the CPU and GPU. The SoC may optionally include other components such as, for example, the storage 606 and the network device 608 into a single integrated device. In other examples, the CPU and GPU are connected to each other via a peripheral connection device such as peripheral component interconnect (PCI) express or another suitable peripheral data connection. In one example, the CPU is a commercially available central processing device that implements an instruction set such as one of the x86. ARM, Power, or microprocessor without interlocked pipeline stage (MIPS) instruction set families.

Regardless of the specifics, during operation the processor 604 executes stored program instructions that are retrieved from the storage 606, such as those of the data fusion application 132. The stored program instructions accordingly include software that controls the operation of the processors 604 to perform the operations described herein. The storage 606 may include both non-volatile memory and volatile memory devices. The non-volatile memory includes solid-state memories, such as not and (NAND) flash memory, magnetic and optical storage media, or any other suitable data storage device that retains data when the system is deactivated or loses electrical power. The volatile memory includes static and dynamic random-access memory (RAM) that stores program instructions and data during operation of the system 100. Examples of data stored to the storage 606 may include V2X messages 120, modulated light data 122, data stored in the buffer 308, as well as the associated V2X camera objects 312, unassociated V2X objects 314, and unassociated camera objects 316.

The GPU may include hardware and software for display of at least two-dimensional (2D) and optionally three-dimensional (3D) graphics to the output device 610. The output device 610 may include a graphical or visual display device, such as an electronic display screen, projector, printer, or any other suitable device that reproduces a graphical display. As another example, the output device 610 may include an audio device, such as a loudspeaker or headphone. As yet a further example, the output device 610 may include a tactile device, such as a mechanically raiseable device that may, in an example, be configured to display braille or another physical output that may be touched to provide information to a user.

The input device 612 may include any of various devices that enable the computing device 602 to receive control input from users. Examples of suitable input devices that receive human interface inputs may include keyboards, mice, trackballs, touchscreens, voice input devices, graphics tablets, and the like.

The network devices 608 may each include any of various devices that enable the vehicles 102 and road entities 124 to send and/or receive data from external devices over networks. Examples of suitable network devices 608 include an Ethernet interface, a Wi-Fi transceiver, a cellular transceiver, or a BLUETOOTH or Bluetooth Low Energy (BLE) transceiver, an ultra wideband (UWB) transceiver or other network adapter or peripheral interconnection device that receives data from another computer or external data storage device, which can be useful for receiving large sets of data in an efficient manner.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as read-only memory (ROM) devices and information alterably stored on writeable storage media such as floppy disks, magnetic tapes, compact discs (CDs), RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, life cycle, marketability, appearance, packaging, size, serviceability, weight, manufacturability, case of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An ego road entity for performing data fusion of radio frequency (RF) and visual data, comprising:
- a transceiver;
- a camera; and
- one or more controllers of the ego road entity, configured to
  - receive, via the transceiver, a vehicle-to-everything (V2X) message from a remote road entity, the V2X message including one or more V2X data elements descriptive of the remote road entity,
  - capture, using the camera, visible-light communication (VLC) modulated light data within a sensing area surrounding the ego road entity, the modulated light data being sent from the remote road entity and carrying a modulated light transmission encoding one or more optical signaling data elements descriptive of the remote road entity,
  - decode the modulated light transmission in the modulated light data to identify the one or more optical signaling data elements in the modulated light data descriptive of the remote road entity,
  - perform an association of the one or more V2X data elements with the one or more optical signaling data elements to identify associated V2X camera objects where the V2X message and the modulated light data refer to the same remote road entity, wherein the V2X data elements and the modulated light data are fused into a combined representation of the remote road entity, and
  - process the combined representation of the remote road entity based on the association.

2. The ego road entity of claim 1, wherein the modulated light data encodes, using VLC, one or more of identifier (ID), object type, heading, speed, or location of the remote road entity, and the association is performed by matching one or more of the ID, the object type, the heading, the speed, or the location to corresponding information in the V2X message.

3. The ego road entity of claim 1, wherein the ego road entity includes exterior lights, and the one or more controllers of the ego road entity are configured to:
- using the transceiver, broadcast V2X messages including vehicle information for reception by road entities, the vehicle information including one or more of ID, object type, heading, speed, or location of the ego road entity; and
- using the exterior lights, send modulated light transmissions descriptive of the ego road entity for reception by road entities, the modulated light transmission also including the vehicle information.

4. The ego road entity of claim 1, wherein the one or more controllers are further programmed to:
- identify remote road entities in the modulated light data by performing object detection on images captured by the camera; and
- focus the decoding of the modulated light transmission on regions captured by the camera that contain remote road entities.

5. The ego road entity of claim 1, wherein the one or more controllers are further programmed to:
- generate V2X messages for any modulated light data received from remote road entities with no corresponding V2X messages based on the association; and
- broadcast the generated V2X messages using the transceiver.

6. The ego road entity of claim 1, wherein the one or more controllers are further programmed to utilize the combined representation for providing driver alerts.

7. The ego road entity of claim 1, wherein the one or more controllers are further programmed to provide the combined representation to autonomous or semiautonomous driving functions of the ego road entity.

8. A method for performing data fusion of radio frequency (RF) and visual data, comprising:
- receiving, via a transceiver of, a vehicle-to-everything (V2X) message from a road entity, the V2X message including one or more V2X data elements descriptive of the road entity;
- capturing, using a camera, visible-light communication (VLC) modulated light data within a sensing area surrounding a vehicle, the modulated light data being sent from the road entity and carrying a modulated light transmission encoding one or more optical signaling data elements descriptive of the remote road entity;

decoding the modulated light transmission in the modulated light data to identify the one or more optical signaling data elements in the modulated light data descriptive of the road entity;

performing an association of the one or more V2X data elements with the one or more optical signaling data elements to identify associated V2X camera objects where the V2X message and the modulated light data refer to the same road entity, wherein the V2X data elements and the modulated light data are fused into a combined representation of the road entity; and processing the combined representation of the road entity based on the association.

9. The method of claim 8, wherein the modulated light data encodes, using VLC, one or more of identifier (ID), object type, heading, speed, or location of the road entity, and the association is performed by matching one or more of the identifier (ID), the object type, the heading, the speed, or the location to corresponding information in the V2X message.

10. The method of claim 8, further comprising:

using the transceiver, broadcasting V2X messages including vehicle information for reception by road entities, the vehicle information including one or more of ID, object type, heading, speed, or location of the vehicle; and using exterior lights of the vehicle, sending modulated light transmissions descriptive of the vehicle for reception by road entities, the modulated light transmission also including the vehicle information.

11. The method of claim 8, further comprising:

identifying road entities in the modulated light data by performing object detection on images captured by the camera; and focusing the decoding of the modulated light transmission on regions captured by the camera that contain road entities.

12. The method of claim 8, further comprising:

decoding a second modulated light transmission in the modulated light data;

determining that no V2X message is received from any road entities corresponding to the second modulated light transmission based on the association;

generating a sensor data sharing V2X message including information from the second modulated light transmission; and broadcasting the sensor data sharing V2X message using the transceiver for reception by other road entities.

13. The method of claim 8, further comprising utilizing the combined representation for providing driver alerts.

14. The method of claim 8, further comprising providing the combined representation to autonomous or semiautonomous driving functions of the vehicle.

15. The method of claim 8, further comprising utilizing a machine learning model to recognize remote road entities in one or more frames of captured using the camera.

16. The method of claim 15, further comprising:

creating a training set using at least the V2X message and the modulated light data, wherein locations included in the V2X message and/or the modulated light data are used as ground truth for the locations of identified road entities in image data; and retraining the machine learning model using the training set to enhance detection of road entities.

17. The method of claim 16, further comprising deploying the retrained machine learning model for recognizing road entities in image data.

18. A non-transitory computer-readable medium comprising instructions for performing data fusion of radio frequency (RF) and visual data that, when executed by one or more controllers of an ego road entity, causes the ego road entity to perform operations including to:

receive, via a transceiver of the ego road entity, a vehicle-to-everything (V2X) message from a remote road entity, the V2X message including one or more V2X data elements descriptive of the remote road entity;

capture, using a camera of the ego road entity, visible-light communication (VLC) modulated light data within a sensing area surrounding the ego road entity, the modulated light data being sent from the remote road entity and carrying a modulated light transmission encoding one or more optical signaling data elements descriptive of the remote road entity;

decode the modulated light transmission in the modulated light data to identify the one or more optical signaling data elements in the modulated light data descriptive of the remote road entity;

perform an association of the one or more V2X data elements with the one or more optical signaling data elements to identify associated V2X camera objects where the V2X message and the modulated light data refer to the same road entity, wherein the one or more V2X data elements and the modulated light data are fused into a combined representation of the remote road entity; and process the combined representation of the remote road entity based on the association.

19. The non-transitory computer-readable medium of claim 18, wherein the modulated light data encodes, using VLC, one or more of identifier (ID), object type, heading, speed, or location of the remote road entity, and the association is performed by matching one or more of the identifier (ID), the object type, the heading, the speed, or the location to corresponding information in the V2X message.

20. The non-transitory computer-readable medium of claim 18, further comprising instructions that when executed by one or more controllers of the ego road entity, causes the ego road entity to perform operations including to:

identify remote road entities in the modulated light data by performing object detection on images captured by the camera; and focus the decoding of the modulated light transmission on regions captured by the camera that contain remote road entities.

21. The non-transitory computer-readable medium of claim 18, further comprising instructions that, when executed by one or more controllers of the ego road entity, causes the ego road entity to perform operations including to:

decode a second modulated light transmission in the modulated light data;

determine that no V2X message is received from any remote road entities corresponding to the second modulated light transmission based on the association;

generate a sensor data sharing V2X message including information from the second modulated light transmission; and broadcast the sensor data sharing V2X message using the transceiver for reception by other road entities.

22. The non-transitory computer-readable medium of claim 18, further comprising instructions that, when executed by one or more controllers of the ego road entity, causes the ego road entity to perform operations including to utilize the combined representation for providing driver alerts.

23. The non-transitory computer-readable medium of claim 18, further comprising instructions that, when executed by one or more controllers of the ego road entity, causes the ego road entity to perform operations including to provide the combined representation to autonomous or semi-autonomous driving functions of the ego road entity.

24. The non-transitory computer-readable medium of claim 18, further comprising instructions that, when executed by one or more controllers of the ego road entity, causes the ego road entity to perform operations including to:

using the transceiver, broadcast V2X messages including vehicle information for reception by road entities, the vehicle information including one or more of ID, object type, heading, speed, or location of the ego road entity; and using exterior lights of the ego road entity, send modulated light transmissions descriptive of the ego road entity for reception by remote road entities, the modulated light transmission also including the vehicle information.

25. The non-transitory computer-readable medium of claim 18, further comprising instructions that, when executed by one or more controllers of the ego road entity, causes the ego road entity to perform operations including to provide the combined representation to a machine learning model to aid in association of an image with the remote road entity.

26. The ego road entity of claim 1, wherein the modulated light data and the V2X message each includes a common identifier (ID) of the vehicle, and the association of the V2X message with the information decoded from the light transmissions of the modulated light data is performed by matching the common ID between the V2X message and the light transmissions.

* * * * *